United States Patent
Prior Pinto Oliveira et al.

(10) Patent No.: US 10,479,958 B2
(45) Date of Patent: Nov. 19, 2019

(54) OLIVE POMACE PRODUCTS, METHOD OF PRODUCTION AND THEIR USES

(71) Applicant: UNIVERSIDADE DO PORTO, Oporto (PT)

(72) Inventors: Maria Beatriz Prior Pinto Oliveira, Oporto (PT); Anabela Sílvia Guedes Da Costa, Oporto (PT); Maria Antónia Da Mota Nunes, Oporto (PT); Filipa Alexandra Botelho Pimentel, Oporto (PT)

(73) Assignee: UNIVERSIDADE DO PORTO, Oporto (PT)

( * ) Notice: Subject to any disclaimer, the term of this patent is extended or adjusted under 35 U.S.C. 154(b) by 0 days.

(21) Appl. No.: 16/308,586

(22) PCT Filed: Jun. 9, 2017

(86) PCT No.: PCT/IB2017/053422
§ 371 (c)(1),
(2) Date: Dec. 10, 2018

(87) PCT Pub. No.: WO2017/212450
PCT Pub. Date: Dec. 14, 2017

(65) Prior Publication Data
US 2019/0153352 A1    May 23, 2019

(30) Foreign Application Priority Data
Jun. 9, 2016   (PT) .......................................... 109443

(51) Int. Cl.
*C11B 1/04* (2006.01)
*C05F 5/00* (2006.01)
*C11B 3/00* (2006.01)
*C11B 3/16* (2006.01)

(52) U.S. Cl.
CPC ................ *C11B 1/04* (2013.01); *C05F 5/002* (2013.01); *C11B 3/001* (2013.01); *C11B 3/006* (2013.01); *C11B 3/008* (2013.01); *C11B 3/16* (2013.01); *Y02A 40/21* (2018.01); *Y02P 20/145* (2015.11)

(58) Field of Classification Search
CPC . C11B 1/04; C11B 3/001; C11B 3/006; C11B 3/008; C11B 3/16; C05F 5/002
USPC ........................................................... 554/9
See application file for complete search history.

(56) References Cited

FOREIGN PATENT DOCUMENTS

| EP | 2392560 A1 | * | 12/2011 | ............. C07C 62/32 |
|----|-----------|---|---------|-------------------------|
| EP | 2392560 A1 |   | 12/2011 |                         |
| PA | 105914 A  |   | 4/2013  |                         |
| PT | 105275 A  |   | 2/2012  |                         |

(Continued)

OTHER PUBLICATIONS

Araujo et al: "Phenolic compounds from olive mill wastes: Health effects, analytical approach, and application as food antioxidants", Trends in Food Science and Technology,, vol. 45, No. 2, pp. 200-201. (Year: 2015).*

(Continued)

*Primary Examiner* — Deborah D Carr
(74) *Attorney, Agent, or Firm* — Leason Ellis LLP (57) ABSTRACT

The present disclosure relates to olive pomace and a green methodology to obtain derivative products for it valorization. The obtained products may be used as a solid substrate, nutraceuticals, cosmetics or food supplements.

16 Claims, 7 Drawing Sheets

(56) References Cited

FOREIGN PATENT DOCUMENTS

WO     2005123603 A1    12/2005

OTHER PUBLICATIONS

Ramos et al: "Valorization of olive mill residues: Antioxidant and breast cancer antiproliferative activities of hydroxytyrosol-rich extracts derived from olive oil by-products", vol. 46, pp. 359-368. (Year: 2013).*
Peralbo-Molina et al: "Tentative Identification of Phenolic Compounds in Olive Pomace Extracts Using Liquid ChromatographyTandem Mass Spectrometry with a Quadrupole-Quadrupole-Time-of flight Mass Detector" JAFC, vol. 60, No. 45. (Year: 2012).*
Sampedro et al: "Effect of a New Thermal Treatment in Combination with Saprobic Fungal Incubation on the Phytotoxicity Level of Alperujo", JAFC, vol. 59, No. 7, (Year: 2011).*
Fernandez-Bolanos et al: "Production in Large Quantities of Highly purified Hydroxytyrosol from Liquid-Solid Waste of Two-Phase Olive Oil Processing or Alperujo", Journal of Agricultural and Food Chemistry, vol. 50, No. 2. (Year: 2002).*
Aguilera et al. "Phenolic compounds in fruits and beverages consumed as part of the mediterranean diet: their role in prevention of chronic diseases." Phytochemistry Reviews 15.3 (2016): 405-423.
Akter et al. "Nutritional compositions and health promoting phytochemicals of camu-camu (*Myrciaria dubia*) fruit: A review." Food Research International 44.7 (2011): 1728-1732.
Allouche et al. "Toward a high yield recovery of antioxidants and purified hydroxytyrosol from olive mill wastewaters." Journal of Agricultural and Food Chemistry 52.2 (2004): 267-273.
Alves et al. "Antiradical activity, phenolics profile, and hydroxymethylfurfural in espresso coffee: influence of technological factors." Journal of Agricultural and Food Chemistry 58.23 (2010): 12221-12229.
Ao et al. "Evaluation of antioxidant and antibacterial activities of *Ficus microcarpa* L. *fil.* extract." Food control 19.10 (2008): 940-948.
Apostolidis et al. "In vitro potential of Ascophyllum nodosum phenolic antioxidant-mediated α-glucosidase and α-amylase inhibition." Journal of food science 75.3 (2010): H97-H102.
Araújo et al. "Phenolic compounds from olive mill wastes: Health effects, analytical approach and application as food antioxidants." Trends in Food Science & Technology 45.2 (2015): 200-211.
Arvanitoyannis et al. "Potential uses and applications of treated wine waste: a review." International Journal of Food Science & Technology 41.5 (2006): 475-487.
Bal et al. "Sea buckthorn berries: A potential source of valuable nutrients for nutraceuticals and cosmoceuticals." Food Research International 44.7 (2011): 1718-1727.
Bianco et al. "Biophenolic components of olives." Food Research International 33.6 (2000): 475-485.
Chowdhury et al. "Olive mill waste composting: A review." International Biodeterioration & Biodegradation 85 (2013): 108-119.
Fernández-Bolaños et al. "Production in large quantities of highly purified hydroxytyrosol from liquid—solid waste of two-phase olive oil processing or 'Alperujo'." Journal of Agricultural and Food Chemistry 50.23 (2002): 6804-6811.
Grzegorczyk et al. "Antioxidant activity of extracts from in vitro cultures of *Salvia officinalis* L." Food Chemistry 104.2 (2007): 536-541.
Jung et al. "Free radical scavenging and total phenolic contents from methanolic extracts of Ulmus davidiana." Food Chemistry 108.2 (2008): 482-487.
Kchaou et al. "Effects of extraction solvents on phenolic contents and antioxidant activities of Tunisian date varieties (*Phoenix dactylifera* L.)." Industrial Crops and Products 45 (2013): 262-269.
International Search Report and Written Opinion in corresponding International Patent Application No. PCT/IB2017/053422, dated Aug. 24, 2017. 11 pages.

Lim et al. "Evaluation of antioxidant, antibacterial and anti-tyrosinase activities of four *Macaranga* species." Food Chemistry 114.2 (2009): 594-599.
Lv et al. "Phenolic composition and nutraceutical properties of organic and conventional cinnamon and peppermint." Food Chemistry 132.3 (2012): 1442-1450.
Magalhães et al. "Methodological aspects about in vitro evaluation of antioxidant properties." Analytica Chimica Acta 613.1 (2008): 1-19.
Manios et al. "The effect of heavy metals accumulation on the chlorophyll concentration of *Typha latifolia* plants, growing in a substrate containing sewage sludge compost and watered with metaliferus water." Ecological Engineering 20.1 (2003): 65-74.
Medina et al. "Main antimicrobial compounds in table olives." Journal of agricultural and food chemistry 55.24 (2007): 9817-9823.
Miguel et al. "Pomegranate (*Punica granatum* L.): A medicinal plant with myriad biological properties—A short review." Journal of Medicinal Plants Research 4.25 (2010): 2836-2847.
Moyo et al. "Phenolic composition, antioxidant and acetylcholinesterase inhibitory activities of Sclerocarya birrea and Harpephyllum caffrum (Anacardiaceae) extracts." Food Chemistry 123.1 (2010): 69-76.
Nantitanon et al. "Factors influencing antioxidant activities and total phenolic content of guava leaf extract." LWT—Food Science and Technology 43.7 (2010): 1095-1103.
Ogbunugafor et al. "Physico-chemical and antioxidant properties of Moringa oleifera seed oil." Pakistan Journal of Nutrition 10.5 (2011): 409-414.
Otles et al. "Treatment of olive mill wastewater and the use of polyphenols obtained after treatment." International Journal of Food Studies 1.1 (2012): 85-100.
Peralbo-Molina et al. "Tentative identification of phenolic compounds in olive pomace extracts using liquid chromatography-tandem mass spectrometry with a quadrupole-quadrupole-time-of-flight mass detector." Journal of Agricultural and Food Chemistry 60.46 (2012): 11542-11550.
Ramos et al. "Valorization of olive mill residues: Antioxidant and breast cancer antiproliferative activities of hydroxytyrosol-rich extracts derived from olive oil by-products." Industrial Crops and Products 46 (2013): 359-368.
Rhee et al. "Salicornia herbacea: Botanical, chemical and pharmacological review of halophyte marsh plant." Journal of Medicinal Plants Research 3.8 (2009): 548-555.
Rodis et al. "Partitioning of olive oil antioxidants between oil and water phases." Journal of Agricultural and Food Chemistry 50.3 (2002): 596-601.
Rosello-Soto et al. "Emerging opportunities for the effective valorization of wastes and by-products generated during olive oil production process: non-conventional methods for the recovery of high-added value compounds." Trends in Food Science & Technology 45.2 (2015): 296-310.
Ruberto et al. "Polyphenol constituents and antioxidant activity of grape pomace extracts from five Sicilian red grape cultivars." Food Chemistry 100.1 (2007): 203-210.
Rusan et al. "Evaluation of phytotoxicity effect of olive mill wastewater treated by different technologies on seed germination of barley (*Hordeum vulgare* L.)." Environmental Science and Pollution Research 22.12 (2015): 9127-9135.
Sabatini. "Recent patents in olive oil industry: new technologies for the recovery of phenols compounds from olive oil, olive oil industrial by-products and waste waters." Recent Patents on Food, Nutrition & Agriculture 2.2 (2010): 154-159.
Sampedro et al. "Effect of a new thermal treatment in combination with saprobic fungal incubation on the phytotoxicity level of alperujo." Journal of Agricultural and Food Chemistry 59.7 (2011): 3239-3245.
Selim et al. "Evaluation of phytotoxicity of compost during composting process." Nature and science 10.2 (2012): 69-77.
Sivasankari et al. "Effect of seaweed extracts on the growth and biochemical constituents of Vigna sinensis." Bioresource Technology 97.14 (2006): 1745-1751.
Sofidiya et al. "Free radical scavenging activity of some Nigerian medicinal plant extracts." Pak. J. Biol. Sci 9.8 (2006): 1438-1441.

(56) References Cited

OTHER PUBLICATIONS

Sugiura et al. "Isolation of a new anti-allergic phlorotannin, phlorofucofuroeckol-B, from an edible brown alga, *Eisenia arborea*." Bioscience, biotechnology, and biochemistry 70.11 (2006): 2807-2811.

Tachakittirungrod et al. "Study on antioxidant activity of certain plants in Thailand: Mechanism of antioxidant action of guava leaf extract." Food Chemistry 103.2 (2007): 381-388.

Valta et al. "Adding value to olive oil production through waste and wastewater treatment and valorisation: the case of Greece." Waste and Biomass Valorization 6.5 (2015): 913-925.

Yesil-Celiktas et al. "Determination of phenolic content and antioxidant activity of extracts obtained from Rosmarinus officinalis' calli." Journal of plant physiology 164.11 (2007): 1536-1542.

\* cited by examiner

OLIVE POMACE PRODUCTS, METHOD OF PRODUCTION AND THEIR USES

CROSS-REFERENCE TO RELATED APPLICATIONS

This application is a U.S. National Stage Application under 35 U.S.C. § 371 of International Patent Application No PCT/IB2017/053422, filed Jun. 9, 2016, which claims priority to Portugal Application No. 109443, filed Jun. 9, 2016, which are hereby incorporated by reference in their respective entireties.

TECHNICAL DOMAIN

The present disclosure relates to olive pomace and a green methodology to obtain derivative products for it valorisation.

The obtained products may be used as a solid substrate, nutraceuticals, cosmetics or food supplements.

TECHNICAL BACKGROUND

Globally, the olive oil processing industry is growing. It is a significant sector in the economy of the Mediterranean countries and with an increasing trend in other countries, such as USA. Along with the growth of this agro-industry sector, high rate of residues, namely olive pomace are produced. Olive pomace is an environmental problem due to its high phytotoxicity and cannot be discarded without any treatment (Valta K, Aggeli E, Papadaskalopoulou C, Panaretou V, Sotiropoulos A, Malamis D, et al. Adding Value to Olive Oil Production Through Waste and Wastewater Treatment and Valorisation: The Case of Greece. Waste and Biomass Valorization. 2015;6(5):913-25).

Olive pomace contains the remaining olive fat, water and a great amount of bioactive compounds (Roseelló-Soto E, Koubaa M, Moubarik A, Lopes R P, Saraiva J A, Boussetta N, et al. Emerging opportunities for the effective valorization of wastes and by-products generated during olive oil production process: Non-conventional methods for the recovery of high-added value compounds. Trends in Food Science & Technology. 2015;45(2):296-310).

Olive pomace production is strongly affected by seasonality (October to January). Usually, olive oil production units transfer and discharge olive pomace in large open-air containers to be stored through long periods till processing to olive pomace oil and extracted olive pomace.

Generally, olive pomace oil is obtained by extraction with chemical solvents, such as n-hexane. Afterwards, the final residue can be sold as raw material to burn.

Several works relate to olive pomace are available. For example, PT 105275 A that describes a process to produce blocks and granulates composed by olive pomace and cork dust. This process generates pellets with high heat energy. Another example, PT 105914 A describes the composition of an olive pomace extract mainly composed by hydroxytyrosol with impact in neurodegenerative disease.

Treated olive mill wastewater with different techniques has also been attempted, aiming to reduce olive mill wastewater phytotoxicity (Rusan M J, Albalasmeh A A, Zuraiqi S, and Bashabsheh M. Evaluation of Phytotoxicity Effect of Olive Mill Wastewater Treated by Different Technologies on Seed Germination of Barley (Hordeum Vulgare L.). Environmental Science Pollution Research. 2015;12:9127-35). Also, several studies are being conducted in composting wastes using olive pomace and other residues for soils fertilization (Chowdhury AKMB, Akratos C S, Vayenas D V, and Pavlou S. Olive Mill Waste Composting: A Review. International Biodeterioration & Biodegradation. 2013;85: 108-19).

Countries that usually have a tradition in olive oil production, such as Spain and Italy, have already some technologies focusing the recovery of bioactive compounds from olive pomace. Sabatini (2010) described different patents to obtain olive polyphenols concentrate using extraction and membrane separation techniques. The methodologies for preparation of hydroxytyrosol esters and tyrosol and/or hydroxytyrosol and procedures for the treatment of oil mill wastewaters allow a recovery of water up to 85% and highly pure tyrosol and hydroxytyrosol (Sabatini N. Recent Patents in Olive Oil Industry: New Technologies for the Recovery of Phenols Compounds from Olive Oil, Olive Oil Industrial by-Products and Waste Waters. Recent Patents on Food, Nutrition & Agriculture. 2010;2:154-9). None of those studies describe the destination of the final solid fraction.

These facts are disclosed in order to illustrate the technical problem addressed by the present disclosure.

BRIEF DESCRIPTION

Olive pomace is an environmental burden due to it phytotoxic effect. Nevertheless, it is a natural source of bioactive compounds with major applications for human health and well-being. It can be characterized as:
- raw olive pomace obtained directly from olive mills hereinafter called "raw olive pomace" (ROP) or;
- extracted/dried/defatted olive pomace (without oil)—olive pomace obtained from industries that extract crude olive-pomace oil from the pomace obtained in mills hereinafter called "defatted olive pomace" (DOP).

The present disclosure also relates the main three products obtainable after olive pomace treatment with the described processing, namely an olive pomace fat mixture, extracted bioactive compounds, and a solid substrate for agricultural applications, namely as soilless culture.

The present disclosure solves the environmental problem of the massive amounts of residues, generated by olive oil industries, using an eco-friendly process. Therefore, with the present disclosure it is possible to valorize the bioactive compounds of the olive pomace and simultaneously to reduce it environmental burden.

With the present disclosure, olive pomace gives rise to an olive pomace aqueous extract and a solid substrate. The olive pomace aqueous extract is defined as an aqueous solution that contains water soluble compounds obtained by the described continuous procedure. The solid substrate is defined as the dried solid fraction of olive pomace obtained after aqueous extractions and is an end product of the procedure.

Therefore, the present disclosure relates to a process for treating olive pomace into a solid substrate and olive pomace aqueous extracts as well as their respective applications.

The bioactive compounds and fat, natural ingredients, for application in food, pharmaceutical, and/or cosmetic industries are also herein disclosed.

The products obtained from the olive pomace aqueous extracts are added-value products that can be used by the food industry to improve food nutritional profile, technological properties/functions of food additives and to extend food products shelf life. Moreover, the olive pomace aqueous extracts rich in bioactive compounds can be used in the formulation of nutraceuticals, cosmetics or food supplements. Also, the products obtained from the olive pomace aqueous extracts rich in bioactive compounds are added-value products that can be used by cosmetic industry to improve technological properties/functions of cosmetic products and cosmeceuticals.

The solid substrate end product obtained from the olive pomace is an added-value product with low level of phytotoxic phenolic compounds, in particular less than 100 mg gallic acid equivalents (GAE)/100 g of wet weight, more preferably less than 76 mg GAE/100 g of wet weight, preferably 53 mg EAG/100 g. It may be used in agriculture as soil, agricultural additive or agricultural substrate, in particular as soil fertilizers for plant cultivation, soil substrates, or soilless culture additives. In these possible uses are included applications to produce products for human consumption and/or flower and/or ornamental plant cultivation. Due to its reduced phytotoxicity it can also be used to decorate flower pots or gardens.

The solid substrate may be used for soilless culture. This application has not been, so far, disclosed. Furthermore, the solid substrate is distinct from other products with similar purposes, as coir and other organic and inorganic substrates: it is a renewable source, obtained from a by-product discharged in large amounts in all olive oil producers' countries, like Portugal, and solves a challenging environmental problem.

The disclosure relates to several extracting steps to obtain olive pomace-derived ingredients, olive fat, bioactive compounds, and finally a substrate for agricultural applications, namely for soilless culture. After these processing steps, the environmental burden of this by-product will be overcome because phytotoxic compounds were removed. The GAE are the units used to express the phenol content of a given analyte/extract/substrate.

In an embodiment, the GAE are determined using a spectrophotometric method, in particular a 500 μL of the aqueous solution are mixed with 2.5 mL of Folin-Ciocalteu reagent and 2 mL of a $Na_2CO_3.10H_2O$ solution. The mixture is protected from light at 45° C. during 15 min. After 30 min at room temperature, the absorbance is read at 765 nm. A calibration curve for the standard gallic acid is used (linearity range 5-100 μg/mL, r=0.999). The process now disclosed, is an eco-friendly process, which submits olive pomace to several extracting steps to decrease the olive fat and bioactive compounds, allowing the development of added-value products. Therefore, the present disclosure also relates to extracted olive fat and extracted bioactive compounds that are obtained from the olive pomace after the process now disclosed. Simultaneously, this process reduces olive pomace phytotoxicity making it suitable for agricultural applications.

The procedure now disclosed as well as the products obtained allow to recover not a specific compound but all of them present in the aqueous extract, reducing the phytotoxicity of the end product.

The present disclosure relates to an olive pomace or an olive pomace solid substrate comprising:
  up to 1% (m/m) of olive fat material and;
  up to 0.09% (m/m) of phytotoxic compounds, preferably up to 0.06% (m/m).

In an embodiment, the olive pomace or olive pomace solid substrate may comprise up to 0.5% (m/m) of the olive fat material.

In an embodiment, the olive pomace or olive pomace solid substrate may comprise up to 0.04% (m/m), preferably up to 0.02% (m/m) of the phytotoxic compounds.

In an embodiment, the above-mentioned phytotoxic compounds are fatty acids and/or phenolic compounds, in particular are phenolic compounds selected from the following list: aglyconic and glycosidic forms in particular, hydroxytyrosol, tyrosol, oleuropein, verbascoside, elenolic acid, catechol, rutin or mixtures thereof.

The present disclosure also relates to the use of an olive pomace or an olive pomace solid substrate as soil or as an agricultural additive.

In an embodiment, the agricultural additive above-mentioned may comprise a germination index of at least 80%, preferably at least 85%, more preferably at least 90%, even more preferably at least 95%.

In an embodiment, the agricultural additive above-mentioned may comprise a pH of 4.8-5.8, preferably a pH of 5.1-5.8, more preferably a pH of 5.5-7.5.

In an embodiment, the agricultural additive above-mentioned may comprise at most 170 mg gallic acid equivalents/100 g of wet weight of olive pomace, preferably at most 100 mg gallic acid equivalents/100 g of wet weight of olive pomace, more preferably 20-60 mg gallic acid equivalents/100 g of wet weight of olive pomace.

In an embodiment, said agricultural additive may be a soil fertilizer, a soil substrate additive, an agricultural irrigation additive, or a soilless culture additive.

The present disclosure also relates to a method for obtaining the olive pomace solid substrate previously described and/or an olive pomace aqueous extract comprising the following steps:
  extracting of an olive fat from an olive pomace;
  adding water to the olive pomace in a 1:15-1:80 (mass of olive pomace:
  volume of water) ratio to form a solution; preferably 1:40-1:50;
  a first stirring at 600 rpm for 10-90 minutes, preferably 60-90 minutes,
  until 40±5° C. is reached; a second stirring at 600 rpm for 10-90 minutes,
  preferably 60-90 minutes, after the 40±5° C. is reached;
  filtrating the stirred solution to collect an olive pomace solid phase and an olive pomace aqueous extract;
  adding water to the olive pomace solid phase previously collected in a 1:15-1:80 (mass of olive pomace solid phase:volume of water) ratio to form a solution;
  a third stirring at 600 rpm for 10-90 minutes, preferably 60-90 minutes, until 40±5 ° C.;
  a fourth stirring at 600 rpm for 10-90 minutes, preferably 60-90 minutes, after the 40±5° C. is reached;
  filtrating the stirred solution to collect an olive pomace solid phase and an olive pomace aqueous extract;
  collecting the olive pomace solid phase and the olive pomace aqueous extract.

In an embodiment, the step of adding water to the olive pomace or to the pomace solid phase may be performed in a ratio of 1:15-1:80, preferably 1:20-1:60, more preferably 1:40-1:50.

In an embodiment, the step of drying the olive pomace solid phase may be carried out for 60 minutes at 60° C., in particular in a ventilated oven until 15% of the moisture is reached, preferably 5% moisture is reached.

In an embodiment, the steps of adding water, stirring, filtrating and collecting and drying may be repeated, preferably two or more times, using olive pomace, in particular to obtain a germination index (GI) of more than 85%, preferably more than 90%, more preferably more than 95%.

Throughout the description and claims the word "comprise" and variations of the word, are not intended to exclude other technical features, additives, components, or steps. Additional objectives, advantages and features of the solution will become apparent to those skilled in the art upon examination of the description or may be learned by practice of the solution.

BRIEF DESCRIPTION OF THE DRAWINGS

The following figures provide preferred embodiments for the present disclosure and should not be seen as limiting the scope of the disclosure.

DETAILED DESCRIPTION

Olive pomace sustainable processing intends to develop olive pomace-derived ingredients and products including an olive fat-based mixture, a bioactive rich extract and a solid substrate for agricultural applications as soilless culture.

Figure 1:
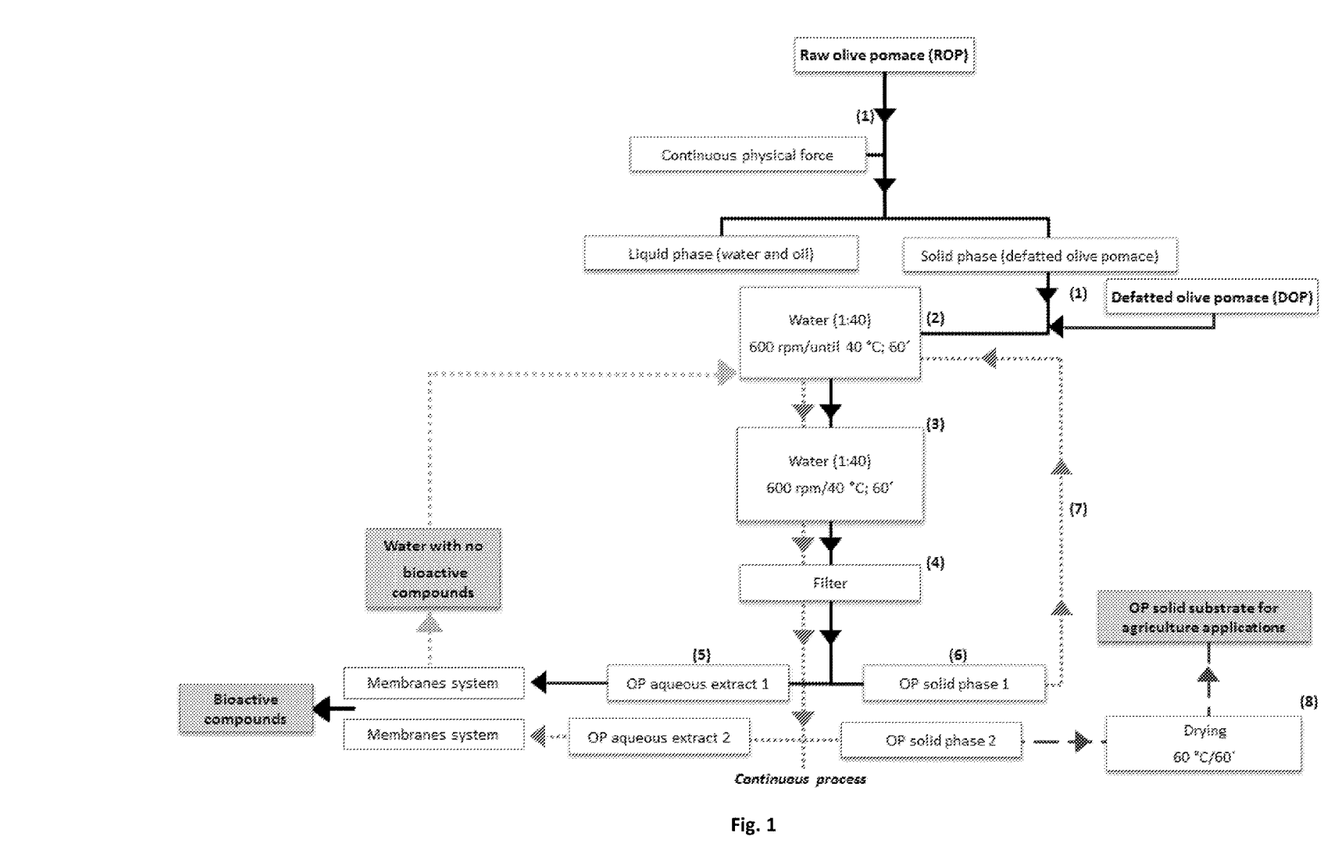
FIG. 1: Flow diagram of the olive pomace processing. ROP—raw olive pomace; DOP—Defatted olive pomace; OP—olive pomace.

FIG. 1 describes an embodiment of the present disclosure, in particular an embodiment of the process now disclosed.

In an embodiment, olive pomace is reprocessed repeating the phases of malaxation and centrifugation. Then, the olive pomace is pressed. Three different phases are obtained: an oil phase, an aqueous phase, and the defatted olive pomace.

In an embodiment, after recovering the olive pomace fat, an extracting process for olive pomace defatted treatment is applied. It is added water to the olive pomace, in particular 1.875 g of olive pomace to 75-150 mL of water (1:40-1:80) (mass of olive pomace solid phase:volume of water). The solution is continuously stirred between 600 and 900 rpm in a heating plate (MS-H-S10 10-Channel Classic Magnetic Hotplate Stirrer) until reaching 40±5° C. during 60-90 minutes, preferably for another 60 minutes. This procedure must be continued, in particular for another 60-90 minutes (steps 2 and 3), preferably for another 60 minutes. The obtained solution is filtered (step 4) using a Whatman® qualitative filter paper, Grade 4.

Therefore, two different products are obtained after the filtration step, in particular an aqueous extract rich in phenolic compounds (step 5) (OP aqueous extract 1 and OP aqueous extract 2) and the solid phase (OP solid phase) (step 6).

In an embodiment, the above-mentioned steps 2, 3, 4 may be repeated with the OP solid phase previously obtained. Therefore, a continuous cyclic process may be carried out and the extraction process is repeated as previously described (step 7). It is obtained a second olive pomace aqueous extract (OP aqueous extract 2) and a second olive pomace solid phase (OP solid phase 2).

In an embodiment, the OP solid phase is collected and dried in a ventilated oven, in particular for 60 to 90 minutes at 55-65° C. until a moisture content of 5-15% (m/m), preferably 5-6% (m/m)(step 8). Thus, it is obtained the OP solid substrate.

In an embodiment, the substrate can be considered as non-toxic when the germination index is higher than 80%, preferably 85%. The phytotoxicity of the OP solid substrate was evaluated using the Germination Index (GI) according to well established scientific references (Rusan M J, Albalasmeh A A, Zuraiqi S, and Bashabsheh M. Evaluation of Phytotoxicity Effect of Olive Mill Wastewater Treated by Different Technologies on Seed Germination of Barley (Hordeum Vulgare L.). Environmental Science Pollution Research. 2015;12:9127-35; Selim S M, Mona S Z, and Houssam M A. Evaluation of phytotoxicity of compost during composting process. Nature and Science. 2012;10 (2):69-77).

In an embodiment, twenty cress (*Lepidium sativum*) seeds were put to germinate in an aqueous solution obtained from OP solid substrate (in particular 1 g of OP solid substrate in 10 mL of deionized water). Then the seeds were put to germinate at room temperature, in the dark, for 72 hours. The germination just in deionized water was considered as control. After the incubation period, both germination and root length were evaluated to determine GI.

In an embodiment, the total phenolic compounds evaluation was conducted by a spectrophotometric method as already described above (Alves R C, Costa A S, Jerez M, Casal S, Sineiro J, Nunez M J and Oliveira MBPP. Antiradical activity, phenolics profile, and hydroxymethylfurfural in espresso coffee: influence of technological factors. Journal of Agricultural and FoodChemistry. 201;(58): 12221-12229).

In an embodiment, in order to study the optimal extraction conditions, in particular based on the green chemistry, different procedures with deionized water were tested in a laboratory scale varying extraction time, in particular 60 minutes, 120 minutes, and two cycles of 60 minutes and temperature, in particular at room temperature and 40° C. It were also tested different mass/volume (m/v) ratios olive pomace:water, in particular 1:10; 1:15; 1:20; 1:40; 1:50; 1:60; 1:70; 1:80. The solutions (water and olive pomace) were continuously stirred between 600 and 900 rpm (MS-H-S1010-Channel Classic Magnetic Hotplate Stirrer). After that, the solutions were filtered using a Whatman® qualitative filter paper, Grade 4. The OP solid phase was collected and dried in a ventilated oven, in particular for 60 to 90 minutes at 55-65° C. until a moisture content of 5-6% (m/m). This last product is named OP solid substrate. The GI assay of OP solid substrate was performed as already described.

In an embodiment, at room temperature, 60 minutes of extraction, 100% water as solvent and a ratio 1:10 (m/v) allow to obtain the lowest GI (29%). In this OP solid substrate, remained 170 mg EAG of phenolic compounds. At room temperature and using a 1:15 ratio, in the OP substrate still remains 170 mg EAG showing that the maximal extraction levels were achieved.

In an embodiment, a GI of 72% was obtained with a ratio of 1:40, at 40° C. In this case, the OP solid substrate total phenolics content was 86 mg EAG. Despite using the same ratio and temperature, an increase in GI (78%) was observed when the extraction time was increased from 60 to 120 minutes and a decrease in total phenolics, in particular 76 mg EAG, was verified.

In an embodiment, results showed a decrease in total phenolic compounds and an increase in the GI and pH.

In an embodiment, the OP solid substrate obtained after all proposed extraction steps, as listed in technical design, has 53 mg GAE/100 g. The initial olive pomace (defatted olive pomace) total phenolic content is significantly higher (635 mg EAG/100 g of defatted olive pomace) than the OP solid substrate achieved.

The described features of the OP substrate allowed considering it not an environmental hazard due to the absence of the initial phytotoxicity (GI=92%).

In an embodiment, after the first extraction cycle it was obtained an olive pomace which contains 865 mg EAG/100 g of olive pomace and a after a second it contains 139 mg EAG/100 g of olive pomace.

Figure 6:
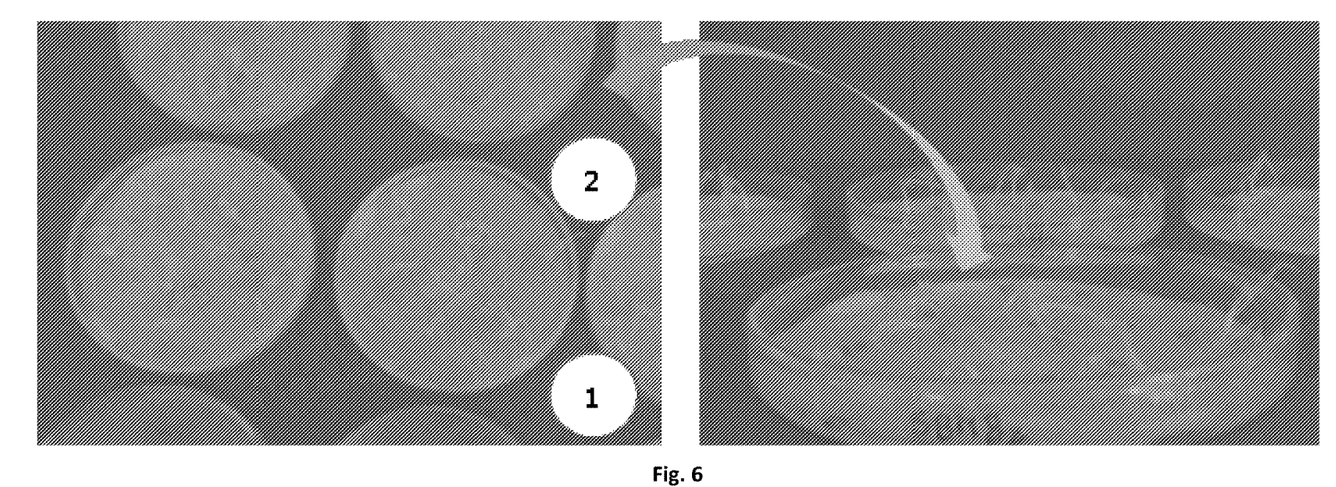
FIG. 6: Germinated seeds (*Lepidum sativum*) (1-GI=3%; 2-GI=92%).
Figure 7:
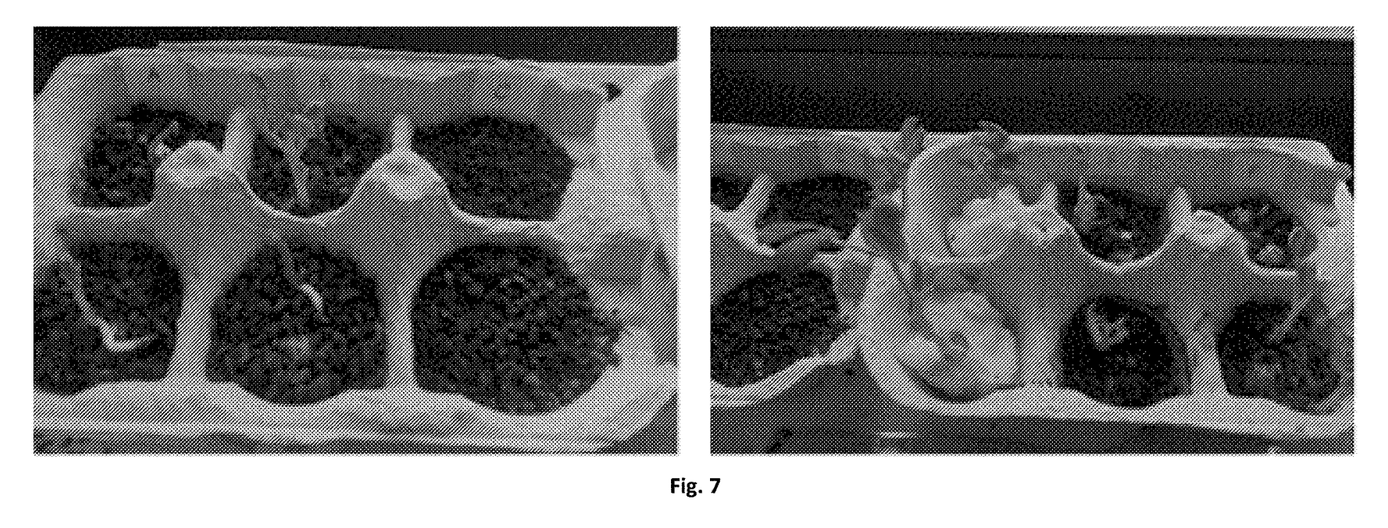
FIG. 7: Preliminary first growing trial with green pea seeds (*Pisum sativum*) (C-GI=3%); D-Control; F-GI=92%).

In an embodiment, the pH values increased along the process from 4.8 for the defatted olive pomace to 5.8 for the OP solid substrate with beneficial effects to plants' growth, as FIGS. 6 and 7 show.

In an embodiment, defatted olive pomace presented a 3% GI but the OP solid substrate obtained after the procedure disclosed in table 1 presented a 92% GI.

In an embodiment, the OP solid substrate was submitted to a preliminary first growing trial with green pea seeds (*Pisum sativum*). Pea seeds were soaked and put to germinate in OP solid substrates (GI=3, 78 and 92%). Results showed the plant germination and growth in two experiments 78% (E) and 92% (F), meaning absence of toxicity (FIG. 7).

TABLE 1

Germination Index (GI) and pH of OP solid substrate and defatted olive pomace.

|  | GI (%) | pH |
| --- | --- | --- |
| OP solid substrate | 92 ± 4 | 5.8 ± 2.0 |
| Defatted olive pomace | 3 ± 0.2 | 4.8 ± 0.1 |

In an embodiment, the fat that remains in olive pomace is extracted, in particular without using chemical solvents (step 1) and used as a base ingredient for an olive oil-based mixture.

In an embodiment, the defatted remaining product was submitted to an aqueous extraction at controlled time and temperature to recover the bioactive compounds—OP aqueous extracts (steps 2, 3, 4, 5). After that, these will be retained in a device and further submitted to different treatments aiming to valorise its known benefits to human health and well-being. The solid end product (OP solid substrate) is suitable for agricultural applications due to its low phytotoxicity (step 8).

The products obtained have high economic value, reduced production costs, and minimal environmental load.

The present disclosure relates to a process for obtaining added-value products from olive pomace wherein said process comprises the following sequential steps:
a. extracting of the remaining olive fat and water by repeating the phases of malaxation and centrifugation followed by the olive pomace pressing in order to separate liquid and solid phases;
b. adding of water to defatted olive pomace to obtain a solution, in a 1:15-1:80 ratio, in particular in a 1:40 ratio (m/v), stirring at 600-900 rpm, in particular at 600 rpm during 60-90 minutes in particular 60 minutes, until 40° C., maintaining the same conditions during more 60-90 minutes, in particular 60 minutes;
c. filtrating of the solution;
d. step b) is repeated using the solid phase obtained in step c);
e. filtrating of the solution;
f. the solid phase is collected;
g. drying for 60 minutes at 60° C., in particular in a ventilated oven till a moisture of 5-15%.

In an embodiment, the products obtainable by the process above-mentioned is an olive fat-based mixture, OP aqueous extracts and an OP solid substrate.

In an embodiment, the OP aqueous extracts are rich in bioactive compounds comprising a high content of phenolic compounds, namely hydroxytyrosol, comselogosid, tyrosol, or their mixtures is also obtained.

TABLE 2

Total phenolics, expressed in milligrams of gallic acid equivalents (GAE) per 100 g of olive pomace.

|  | ROP | OP solid substrate |
| --- | --- | --- |
| After first cycle of extraction | 568 ± 13 | 63 ± 4 |
| After second cycle of extraction | 54 ± 6 | 27 ± 4 |
| Σ Total phenolics | 622 | 89 |

ROP—raw olive pomace;
OP—olive pomace.

In an embodiment, it was determined the antioxidant activity of olive pomace aqueous extract to pure hydroxytyrosol. The reactive oxygen species (ROS) and reactive nitrogen species (RNS) have been associated to the pathogenesis of several diseases such as cardio and neurovascular diseases, diabetes mellitus, and certain types of cancer. Phenolic compounds can act as antioxidants in several ways preventing the oxidative stress due to ROS and RNS (Aguilera Y, Martin-Cabrejas M A and Mejia E G. Phenolic compounds in fruits and beverages consumed as part of the Mediterranean diet: their role in prevention of chronic diseases. Phytochemistry Reviews. 2016; 15(3): 405-423).

In an embodiment, FRAP (ferric reducing antioxidant power) and DPPH* (2, 2-diphenyl-1-picrylhydrazyl) inhibition are two regularly used in vitro assays to evaluate the antioxidant activity of extracts/compounds. They are complementary. In the DPPH* scavenging assay, the radical can be neutralized by direct reduction (via electron transfer) or by radical quenching (via H atom transfer). It is considered an advantageous method for screening the antioxidant capacity of both complex mixtures and pure compounds. The FRAP assay measures the ability of antioxidants to reduce the complex $Fe^{3+}$-TPTZ to the coloured ferrous complex $Fe^{2+}$-TPTZ in acidic medium. FRAP assay detects natural compounds with redox potentials but not compounds that act by radical quenching (H transfer), like DPPH*, since only an electron transfer mechanism occurs (Magalhães L M, Segundo M A, Reis S and Lima J L. Methodological aspects about in vitro evaluation of antioxidant properties. Analytica Chimica Acta. 2008; 613: 1-19).

In olives, the most abundant phenolic compounds are 3, 4-dihydroxyphenyl-ethanol, or hydroxytyrosol, and p-hydroxyphenyl-ethanol, or tyrosol. Both compounds are soluble in water. Therefore, they are mostly present in olive pomace. Hydroxytyrosol has been described as the natural phenolic compound with higher radical scavenging potential with effective antioxidant properties (Rodin P S, Karathanos V T and Mantzavinou A. Partitioning of Olive Oil Antioxidants between Oil and Water Phases. Journal of Agricultural and Food Chemistry. 2002; 50(3): 596-601).

Figure 2:
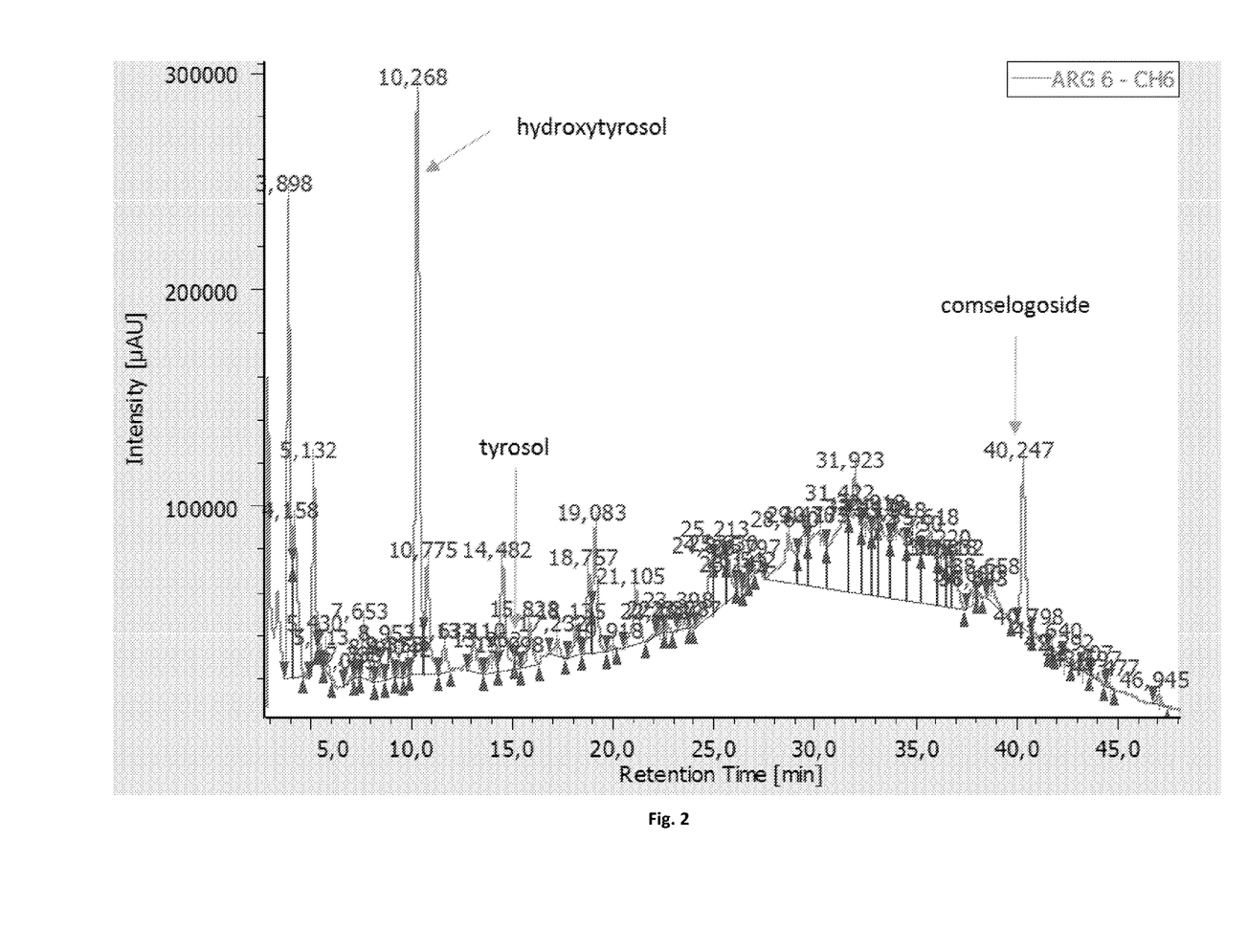
FIG. 2: Chromatogram of major phenolic compounds present in olive pomace aqueous extracts.
Figure 3:
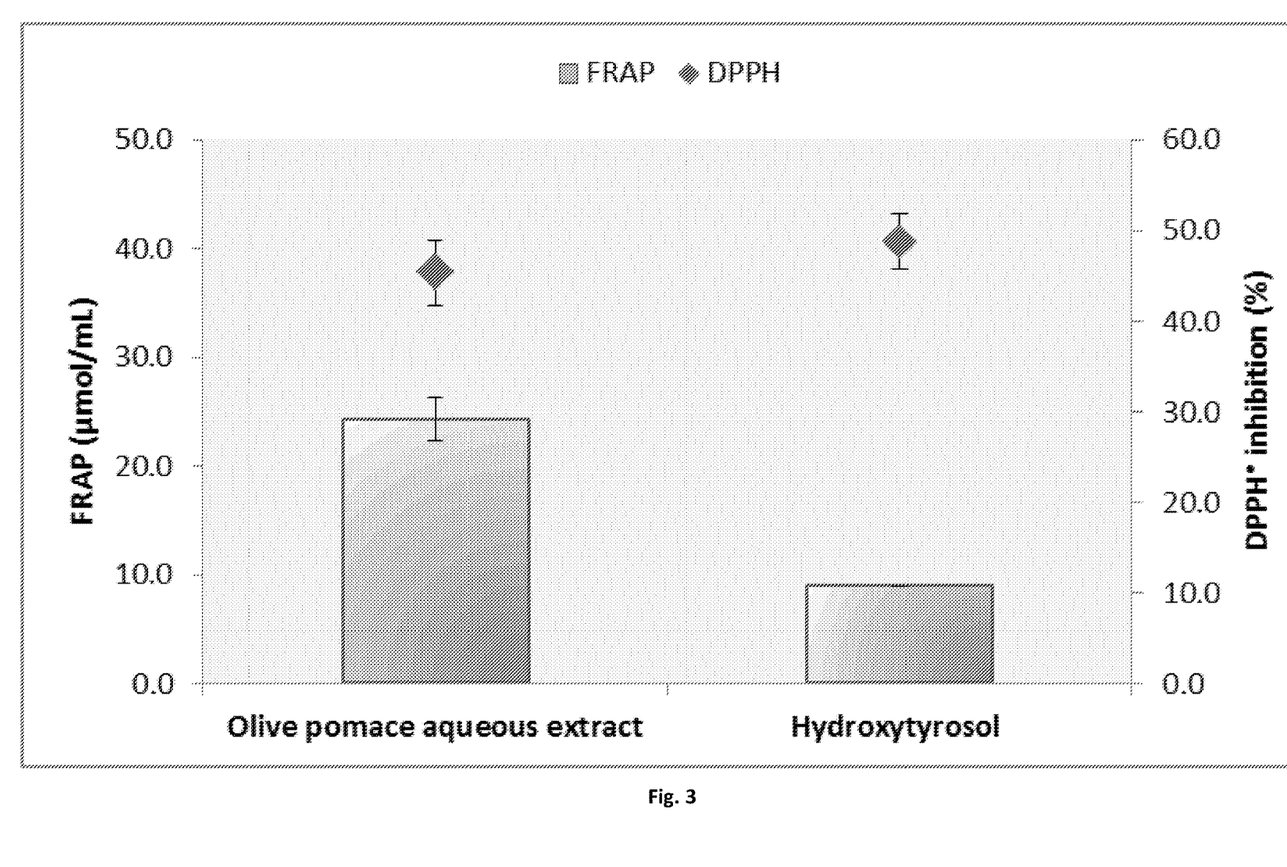
FIG. 3: Antioxidant activity (FRAP and DPPH* inhibition) of olive pomace aqueous extract and pure hydroxytyrosol. FRAP—ferric reducing antioxidant power; DPPH*, (2, 2-diphenyl-1-picrylhydrazyl).
Figure 4:
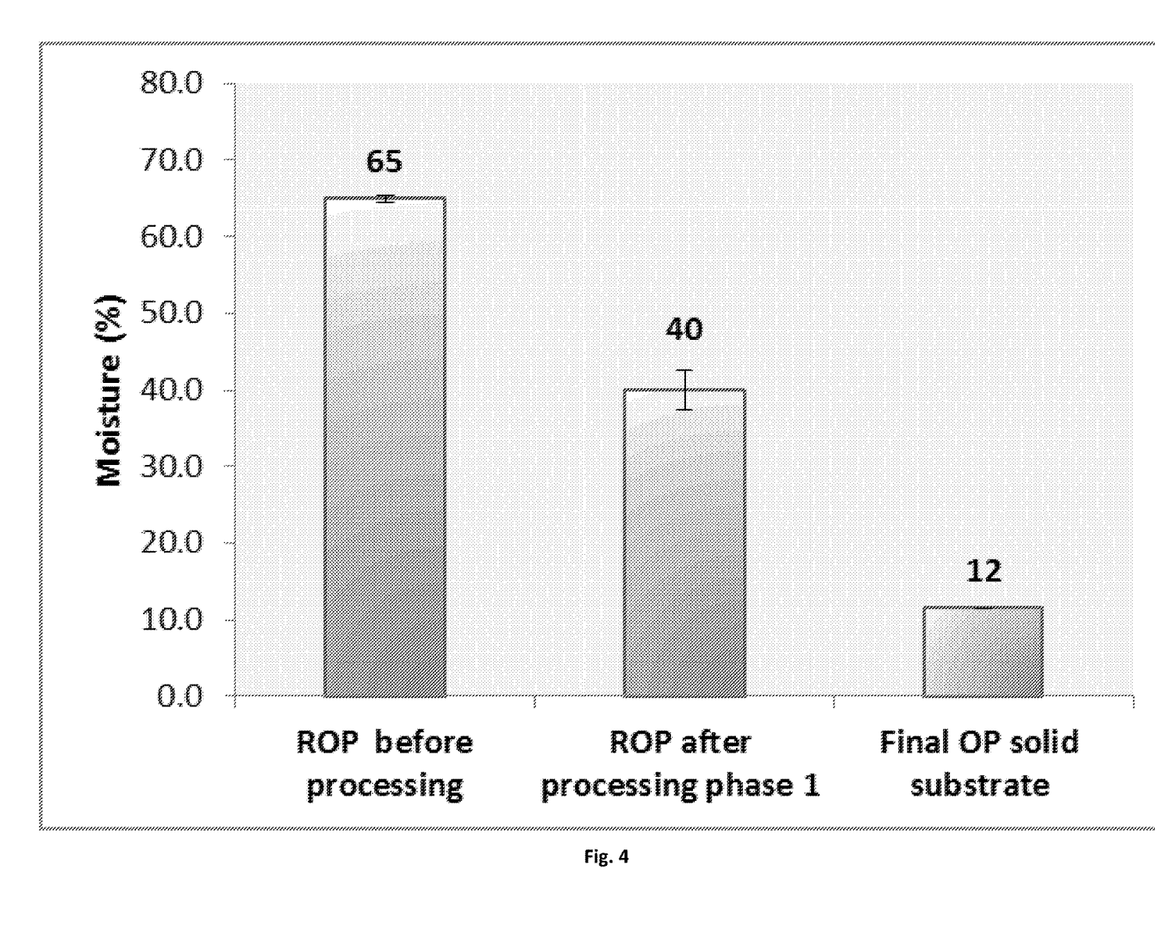
FIG. 4: Moisture content along the raw olive pomace processing (%). ROP—raw olive pomace; OP—olive pomace.
Figure 5:
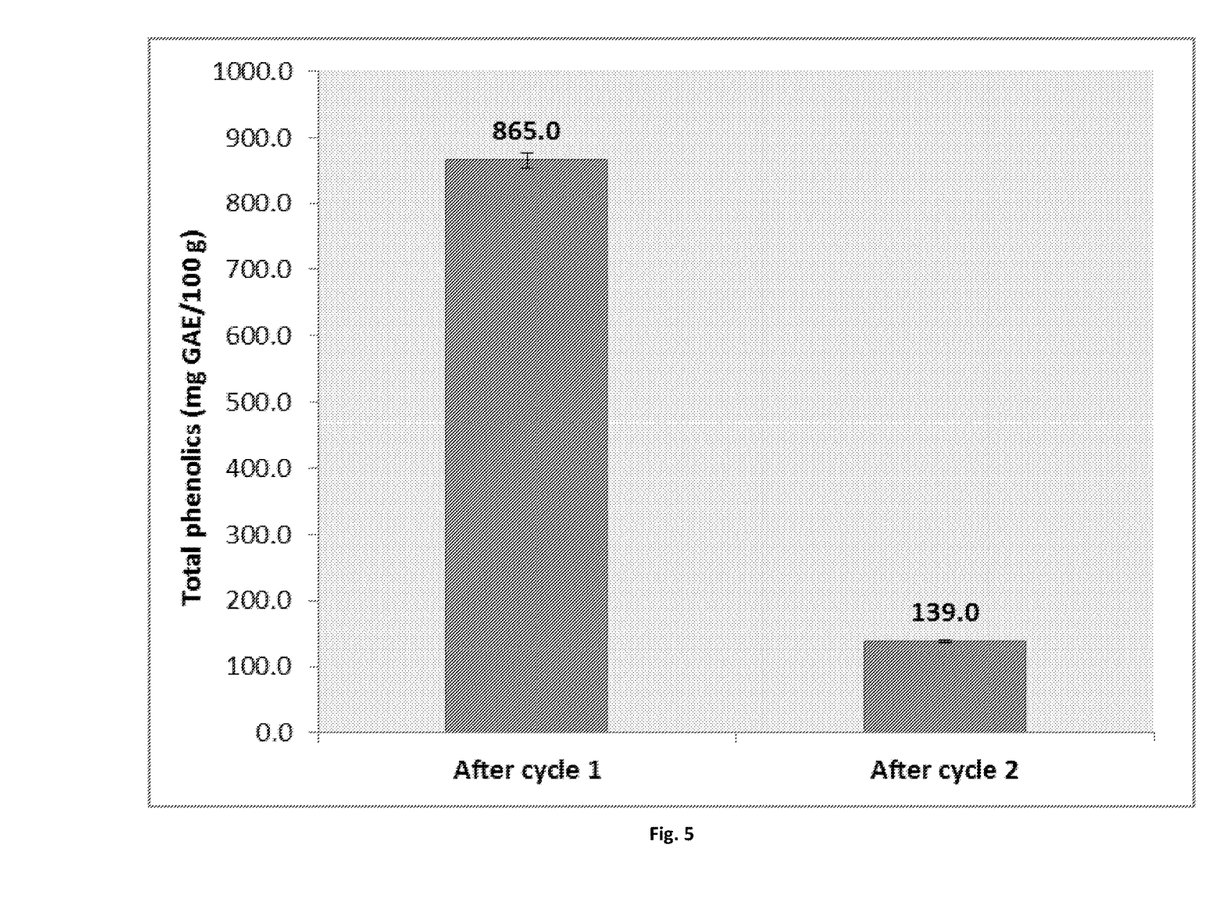
FIG. 5: DOP total phenolics, expressed in mg gallic acid equivalents (GAE), per 100 g of olive pomace after first and second cycle of extraction.

The extract rich in bioactive compounds obtained by the method herein described comprises hydroxytyrosol, tyrosol, comselogoside, and other compounds (FIG. 2). Acting together they can have major antioxidant activity by a synergistic effect. Comparing the antioxidant activity of the olive pomace aqueous extract to a pure hydroxytyrosol standard, the natural extract presents higher antioxidant activity evaluated by FRAP assay (24 and 9 μmol/mL, respectively). Furthermore, there are no significant differences in the antioxidant activity between the pure compound and the extract, considering the % of inhibition of DPPH* (FIG. 3).

In an embodiment, the OP solid substrate may be used for agricultural applications as soilless culture and comprises a low content in phenolic compounds and high germination index.

The disclosure should not be seen in any way restricted to the embodiments described and a person with ordinary skill in the art will foresee many possibilities to modifications thereof.

The above described embodiments are combinable. The following claims further set out particular embodiments of the disclosure.

The invention claimed is:

1. An olive pomace or an olive pomace solid substrate, comprising:
   up to 1% (m/m) of olive fat material; and
   up to 0.06% (m/m) of phytotoxic compounds.

2. The olive pomace or olive pomace solid substrate of claim 1, comprising up to 0.5% (m/m) of the olive fat material.

3. The olive pomace or olive pomace solid substrate of claim 1, comprising up to 0.02% (m/m) of the phytotoxic compounds.

4. The olive pomace or olive pomace solid substrate of claim 1, wherein the phytotoxic compounds are phenolic compounds.

5. The olive pomace or olive pomace solid substrate of claim 1, wherein the phenolic compound is selected from the group consisting of: aglyconic and glycosidic forms in particular, hydroxytyrosol, tyrosol, oleuropein, verbascoside, elenolic acid, catechol, rutin and mixtures thereof.

6. An africultural additive, comprising the olive pomace or olive pomace solid substrate of claim 1.

7. The agricultural additive of claim 6, wherein the agricultural additive has a germination index of at least 85%.

8. The agricultural additive of claim 6, wherein the agricultural additive has a pH of 4.8-5.8.

9. The agricultural additive of claim 8, wherein the agricultural additive has a pH of 5.1-5.8.

10. The agricultural additive of claim 6, wherein the agricultural additive comprises at most 170 mg gallic acid equivalents/100 g of wet weight of olive pomace.

11. The agricultural additive of claim 10, wherein the agricultural additive comprises 20-60 mg gallic acid equivalents/100 g of wet weight of olive pomace.

12. The agricultural additive of claim 6, wherein the agricultural additive is a soil fertilizer, a soil substrate additive, an agricultural irrigation additive, or a soilless culture additive.

13. A method for obtaining an olive pomace solid substrate of claim 1 and an extract, comprising:
   extracting of an olive fat from an olive pomace;
   adding water to the olive pomace in a 1:15-1:80 mass of olive pomace: volume of water ratio to form a first solution;
   stirring the first solution at 600 rpm for 10-90 minutes until a temperature of 40±5° C. is reached;
   stirring the first solution at 600 rpm for 10-90 minutes after the temperature of 40±5° C. is reached;
   filtrating the stirred first solution to collect an olive pomace solid phase and an olive pomace aqueous extract;
   adding water to the collected olive pomace solid phase in a 1:15-1:80 mass of olive pomace solid phase:volume of water ratio to forma second solution;
   stirring the second solution at 600 rpm for 10-90 minutes, until a temperature of the 40° C.±5° C.;
   stirring the second solution at 600 rpm for 10-90 minutes, after the temperature of the 40±5° C. is reached;
   filtrating the stirred second solution to collect a final olive pomace solid phase and a final olive pomace aqueous extract;
   collecting the final olive pomace solid phase and the final olive pomace aqueous extract.

14. The method of claim 13, wherein the step of adding water to the olive pomace or to the pomace solid phase is performed in a ratio of 1:40-1:50.

15. The method of claim 13, further comprising: drying the final olive pomace solid phase for 60 minutes at 60° C. until 5% (m/m) moisture is reached.

16. The method of claim 13 wherein the steps of adding water, stirring, filtrating and collecting and drying are repeated using olive pomace.

* * * * *